(12) United States Patent
Gampel et al.

(10) Patent No.: US 12,177,031 B2
(45) Date of Patent: Dec. 24, 2024

(54) ENHANCED ENDPOINT MULTICAST EMULATION

(71) Applicant: INTERNATIONAL BUSINESS MACHINES CORPORATION, Armonk, NY (US)

(72) Inventors: Eran Gampel, Tel Aviv (IL); Renato J Recio, Austin, TX (US); Gal Sagi, Hod Hasharon (IL); James A Kahle, Austin, TX (US); James C. Sexton, Yorktown Heights, NY (US); Bernard Metzler, Zurich (CH); Ravinder Reddy Amanaganti, San Ramon, CA (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/655,730

(22) Filed: Mar. 21, 2022

(65) Prior Publication Data
US 2023/0299992 A1    Sep. 21, 2023

(51) Int. Cl.
| H04L 12/18 | (2006.01) |
| H04L 12/46 | (2006.01) |
| H04L 61/50 | (2022.01) |
| H04L 61/5038 | (2022.01) |
| H04L 61/5069 | (2022.01) |
| H04L 101/663 | (2022.01) |

(52) U.S. Cl.
CPC ........ *H04L 12/185* (2013.01); *H04L 12/1895* (2013.01); *H04L 12/4641* (2013.01); *H04L 61/50* (2022.05); *H04L 61/5038* (2022.05); *H04L 61/5069* (2022.05); *H04L 2101/663* (2022.05)

(58) Field of Classification Search
CPC ............. H04L 12/185; H04L 61/5069; H04L 12/4641; H04L 45/64; H04L 12/4633; H04L 12/18
See application file for complete search history.

(56) References Cited

U.S. PATENT DOCUMENTS

| 6,331,983 | B1 * | 12/2001 | Haggerty | H04L 12/185 |
| | | | | 370/432 |
| 8,892,689 | B1 * | 11/2014 | Mowry | H04L 45/26 |
| | | | | 709/219 |
| 9,252,963 | B2 * | 2/2016 | McCanne | H04L 65/403 |
| 9,374,270 | B2 * | 6/2016 | Nakil | H04L 67/60 |

(Continued)

FOREIGN PATENT DOCUMENTS

TW    201728124 A    8/2017

OTHER PUBLICATIONS

PCTIB2023/051894, International Search Report and the Written Opinion of the International Searching Authority, mailed Jun. 2, 2023, 12 pgs.

(Continued)

*Primary Examiner* — Madhu Woolcock
(74) *Attorney, Agent, or Firm* — Yee & Associates, P.C.

(57) ABSTRACT

Embodiments for providing enhanced endpoint multicast emulation in a computing environment. One or more multicast operations may be executed on an overlay network using endpoint multicast emulation by using an overlay layer or a virtual extensible LAN ("VXLAN") layer to maintain control over one or more multicast groups.

20 Claims, 8 Drawing Sheets

(56) References Cited

U.S. PATENT DOCUMENTS

| | | | |
|---|---|---|---|
| 9,641,435 B1* | 5/2017 | Sivaramakrishnan | G06F 9/45558 |
| 10,999,195 B1* | 5/2021 | Suryanarayana | H04L 45/64 |
| 2002/0156613 A1* | 10/2002 | Geng | H04L 67/1017 703/23 |
| 2002/0176387 A1* | 11/2002 | Wilmer | H04L 12/18 370/390 |
| 2004/0076162 A1* | 4/2004 | Lee | H04L 12/185 370/395.52 |
| 2007/0183418 A1* | 8/2007 | Riddoch | H04L 12/18 370/389 |
| 2008/0205394 A1* | 8/2008 | Deshpande | H04L 12/1854 370/390 |
| 2011/0080921 A1* | 4/2011 | Ban | H04L 12/1863 370/431 |
| 2013/0170490 A1* | 7/2013 | Kreeger | H04L 41/12 370/390 |
| 2013/0329605 A1 | 12/2013 | Nakil et al. | |
| 2014/0123211 A1 | 5/2014 | Wanser et al. | |
| 2014/0123212 A1* | 5/2014 | Wanser | H04L 63/20 726/1 |
| 2014/0325038 A1* | 10/2014 | Kis | H04L 41/0895 709/220 |
| 2015/0009992 A1* | 1/2015 | Zhang | H04L 12/4625 370/392 |
| 2015/0055651 A1* | 2/2015 | Shen | H04L 12/1854 370/390 |
| 2015/0139229 A1 | 5/2015 | Kamble et al. | |
| 2015/0195137 A1* | 7/2015 | Kashyap | H04L 41/0893 370/254 |
| 2015/0236871 A1* | 8/2015 | Kang | H04L 12/4633 370/390 |
| 2015/0244617 A1* | 8/2015 | Nakil | H04L 41/0895 709/224 |
| 2015/0350081 A1* | 12/2015 | DeCusatis | H04L 12/4641 370/235 |
| 2016/0094650 A1* | 3/2016 | Garcia de Rio | H04L 47/78 709/226 |
| 2016/0119156 A1* | 4/2016 | Drake | H04L 12/4641 709/223 |
| 2016/0149808 A1* | 5/2016 | Cai | H04L 12/4633 370/395.53 |
| 2016/0330046 A1* | 11/2016 | Yang | H04L 61/103 |
| 2017/0034047 A1* | 2/2017 | Bhattacharya | H04L 45/02 |
| 2017/0118166 A1* | 4/2017 | Du | G06F 9/45533 |
| 2017/0208136 A1* | 7/2017 | Zhou | H04L 67/148 |
| 2017/0317919 A1* | 11/2017 | Fernando | H04L 41/40 |
| 2018/0006930 A1* | 1/2018 | Du | H04L 67/56 |
| 2018/0159781 A1* | 6/2018 | Mehta | H04L 45/16 |
| 2018/0212788 A1* | 7/2018 | Iszlai | H04L 12/4641 |
| 2018/0270146 A1* | 9/2018 | Jiang | H04L 45/16 |
| 2018/0310141 A1* | 10/2018 | Yin | H04W 4/08 |
| 2018/0375799 A1* | 12/2018 | Liu | H04L 12/1886 |
| 2019/0018716 A1* | 1/2019 | Guo | H04L 12/1886 |
| 2019/0173689 A1* | 6/2019 | Cherian | G06F 9/45558 |
| 2019/0190734 A1 | 6/2019 | Shen et al. | |
| 2019/0273625 A1 | 9/2019 | Tessmer et al. | |
| 2019/0342354 A1* | 11/2019 | Bosch | H04L 65/80 |
| 2019/0363977 A1* | 11/2019 | Lim | H04L 45/54 |
| 2020/0036646 A1 | 1/2020 | Mathew et al. | |
| 2020/0195579 A1* | 6/2020 | Liu | H04L 12/1886 |
| 2020/0389378 A1* | 12/2020 | Shahbaz | H04L 45/16 |
| 2021/0021444 A1* | 1/2021 | Barabash | G06F 9/45558 |
| 2021/0099380 A1* | 4/2021 | Suryanarayana | H04L 41/0806 |
| 2021/0258178 A1 | 8/2021 | Tessmer et al. | |
| 2021/0288828 A1* | 9/2021 | Dunbar | H04L 12/185 |
| 2022/0116309 A1* | 4/2022 | Lin | H04L 45/033 |
| 2022/0164451 A1* | 5/2022 | Bagwell | H04L 63/0428 |
| 2022/0329457 A1* | 10/2022 | Zaicenko | H04L 63/0876 |
| 2022/0334864 A1* | 10/2022 | K N | G06F 8/61 |
| 2023/0269227 A1* | 8/2023 | Bansal | H04L 63/0272 726/1 |

OTHER PUBLICATIONS

TW112103396 Office Action—Translated, mailed Oct. 2, 2023.
TW112103396 Office Action—Translated, mailed Jan. 23, 2024.
TW112103396 Office Action, mailed Apr. 22, 2024.

* cited by examiner

ENHANCED ENDPOINT MULTICAST EMULATION

BACKGROUND

The present invention relates in general to computing systems, and more particularly, to various embodiments for providing enhanced endpoint multicast emulation in a computing environment using a computing processor.

SUMMARY

According to an embodiment of the present invention, a method for providing enhanced endpoint multicast emulation in a computing environment, by one or more processors, is depicted. One or more multicast operations may be executed on an overlay network using endpoint multicast emulation by using an overlay layer or a virtual extensible LAN ("VXLAN") layer to maintain control over one or more multicast groups.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

A data processing environment comprises a variety of hardware, software, and firmware networking components. A physical network, also called an underlay, is a network defined using such components. Techniques are available presently to construct a logical network, also known as a software defined network (SDN) overlay (hereinafter "overlay," "overlay network," or "OVN"), from such networking components. Essentially, networking components are abstracted into corresponding logical or virtual representations, and the abstractions are used to define the overlay. In other words, an overlay is a logical network formed and operated using logical representations of underlying networking components.

Physical networks usually exist within the demarcated boundary of the data processing environment whose networking components are utilized in the physical network. Unlike a physical network, an overlay can be designed to span across one or more data processing environment. For example, while a physical network may be contained within a datacenter, an overlay may span across one or more datacenters.

As an example, a logical representation of a networking gateway can participate in an overlay, such that a function attributed to the logical representation of the networking gateway in the overlay is actually performed by the underlying networking gateway component in the underlay.

In an overlay, because the actual networking components that perform the networking functions are abstracted into logical entities representing the networking functionality offered by those components and not the actual implementations of those functionalities, something is needed to direct that networking functionality into a functioning logical network. An SDN controller is a component that manages and operates the logical networking components within an overlay.

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host. Hosts also include smart NIC functionality. A smart NIC is a network interface card (NIC) that offloads processing tasks that the system processor would normally handle. Using its own on-board processor, a smart NIC typically performs functions such as encryption/decryption, firewall, and TCP/IP and HTTP processing. Just as a physical computer can be virtualized to multiple virtual machines, each mimicking a physical computer, a smart NIC can also be virtualized. For example, Single Root I/O Virtualization (SR-IOV) is a specification that allows one installed physical device to appear to be multiple separate devices. For example, a quad-port SR-IOV NIC presents itself as four devices, each with a single port. Each of these devices could have up to 256 virtual functions (VFs), each presenting as a single port NIC, for a theoretical total of 1,024 VFs. As a result, an appropriately-configured host can associate each virtual machine with a virtual NIC. When a tenant requires the resources of a virtual machine, a VM for that tenant is created and launched on a host and associated with a NIC VF also running on the host.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

A virtual switch, sometimes herein referred to as a vSwitch, is a software application that allows communication between VMs. A virtual switch is completely virtual and can connect to a network interface card (NIC). A virtual switch merges may merge a single physical switch, a portion of a single switch, or multiple physical switches, into a single logical switch. This helps to increase bandwidth and create an active mesh between servers and switches. A virtual switch may be embedded into a server's installed software or included in a server's hardware as part of its firmware.

Network virtualization by defining overlay networks is an emerging trend in the management and operation of data centers and cloud computing environments. Network virtualization may be implemented using overlay technologies, such as Virtual Extensible Local Area Network (VXLAN), Network Virtualization using Generic Routing Encapsulation (NVGRE), etc., to form tunnels, where an identifier is used to indicate a virtual network for each tunneled packet. More specifically, VXLAN is a specification of an overlay network, i.e., is a network technology by which an overlay network can be implemented. Said differently, VXLAN is a network virtualization technology that uses a VLAN-like encapsulation technique to encapsulate media access control addresses ("MAC")-based open system interconnection ("OSI") layer 2 Ethernet frames within OSI layer 4 User Datagram Protocol (UDP) packets. VXLAN endpoints, which terminate VXLAN tunnels and may be both virtual or physical switch ports, are known as VXLAN tunnel endpoints (VTEPs). The VTEP is a host interface which forwards Ethernet frames from a virtual network via VXLAN, or vice-versa.

An overlay switch ("OSW") is a data communication component serving an overlay network, which is typically a virtual switch. In general, an OSW receives packets from source communication nodes of the overlay network, encapsulates packets of original overlay network according to address of destination communication nodes, and sends them to other OSWs. The OSW also receives packets from other OSWs, de-capsulates and sends them to destination communication nodes of a corresponding overlay network.

These technologies enable multiple virtual networks to be utilized over the same physical network. Usually, a virtual switch component in a host or a virtualization layer (e.g., a hypervisor) provides the virtual ports which may be used to associate virtual machines (VMs) to the various virtual networks. A hypervisor or virtual machine monitor (VMM) is a piece of computer software, firmware or hardware that creates and runs virtual machines. A computer on which a hypervisor runs one or more virtual machines is called a host machine, and each virtual machine is called a guest machine.

One of the goals of network virtualization is to simplify the network provisioning in multi-tenant data processing environments, as well as dedicated customer data processing environments.

Unicasting is a method of sending data point-to-point, to wit, from a single sender to a single receiver. Broadcasting is a method of sending the same data to all possible destinations. Another multi-destination distribution method, multicasting, sends the same data only to interested destinations called receivers by using special address assignments. Internet Protocol (IP) multicast is the process of multicasting IP packets to several receivers in a single transmission of the IP packet. IP multicast is a popular technique used to help conserve bandwidth in the data center and reduce the load on servers.

IP multicast operating in an overlay network is called overlay multicast. Overlay multicast can be achieved in different ways, depending on the support for multicasting provided in the underlay network. Multicast based overlay multicast requires the underlay network to provide support for multicasting. Multicasting in underlay networks is not presently prevalent in data processing environments. Multi-unicast based overlay multicast is a method to transmit multicast packets in the overlay network where the underlay supports unicasting but does not support multicasting.

As mentioned, multicasting is when a group of devices all receive the same messages or packets. Multicasting works by sharing an IP address between multiple devices. Any network traffic directed at that IP address will reach all devices that share the IP address, instead of just one device. Computers and other devices connected to a network use an internet group management protocol ("IGMP") protocol when those computers, devices, or applications want to join a multicast group. A router that supports IGMP listens to IGMP transmissions from each of the computers, devices, or applications in order to figure out which of the computers, devices, or applications belong to which multicast groups. IGMP uses IP addresses that are set aside for multicasting. Each multicast group shares one of these IP addresses.

When a router receives a series of packets directed at the shared IP address, the router will duplicate those packets, sending copies to all members of the multicast group. In physical network switches and routers that support multicast, the packet may be replaced, and the membership list may be maintained for the members downstream group members. IP hosts use IGMP to report their multicast group memberships to any immediately neighboring multicast routing devices. Multicast routing devices use IGMP to learn, for each of their attached physical networks, which groups have members.

Unfortunately, however, one of the current challenges is multicasting is not supported on virtual network typically due to the large numbers of IP host and the large number of potential virtual networks/virtual routers, along with the fact that there is not an IGMP physical appliance that support multi tenancy that also supports virtual networks.

Accordingly, the present invention provides a novel solution that provides an enhanced endpoint multicast emulation in a computing environment. One or more multicast operations may be executed on an overlay network using endpoint multicast emulation by using an overlay layer or the VXLAN layer to maintain control over one or more multicast groups. The present invention provides smart/programmable network card (e.g., a Smart NIC) and may intercept the IGMP messages on the virtual networks and maintain an IGMP/Multicast group membership on an out-of-band SDN path and communicate that membership to all the computer nodes in the system that have at least one virtual entity on that specific virtual group.

When a message is sent by one of the virtual end points, the message will be intercepted by the Smart NIC and sent to all the members using the virtualization tunnel mechanism used in the Virtualization solution like (VLAN, VxLan, Geneve etc.), which is a way to implement virtual IGMP/

Multicast in a distributed manner (e.g., there is no middle boxes) with full hardware offload.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
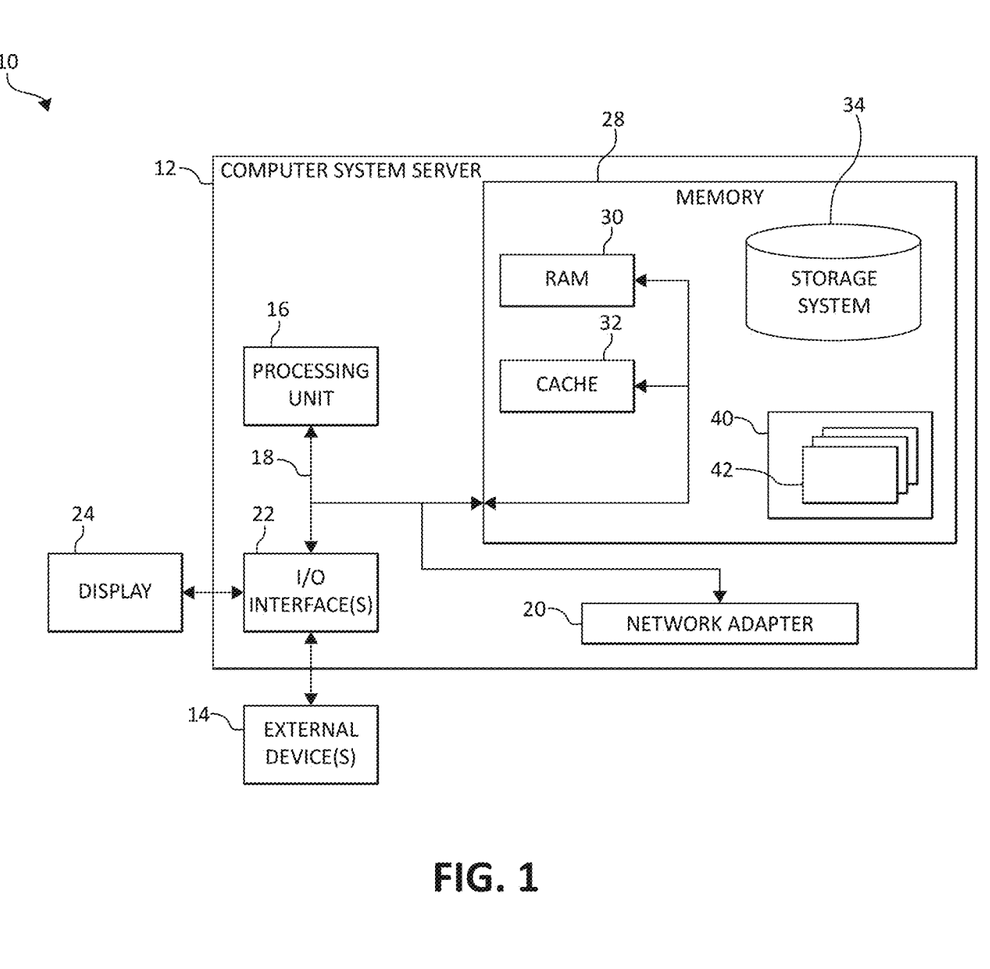
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
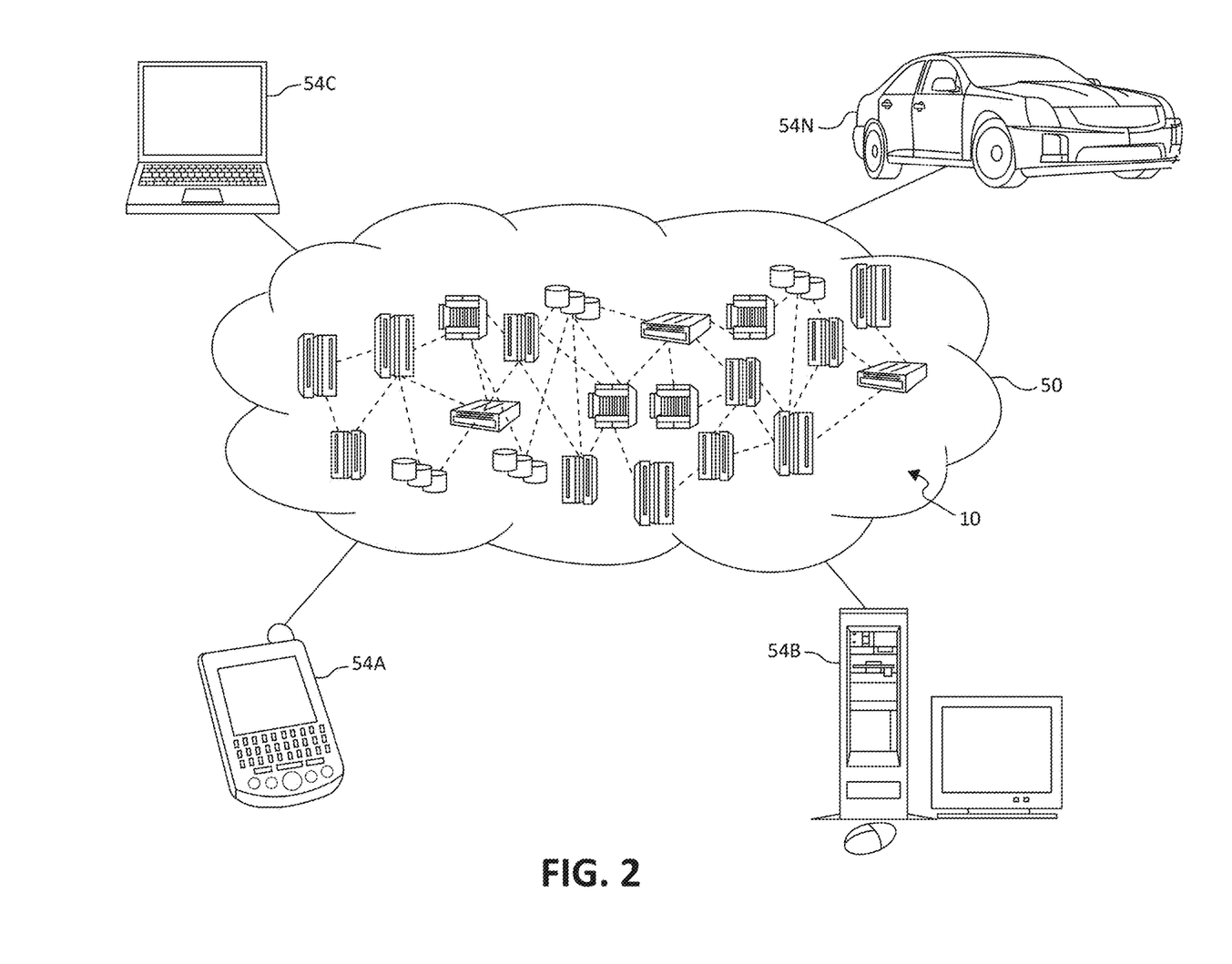
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
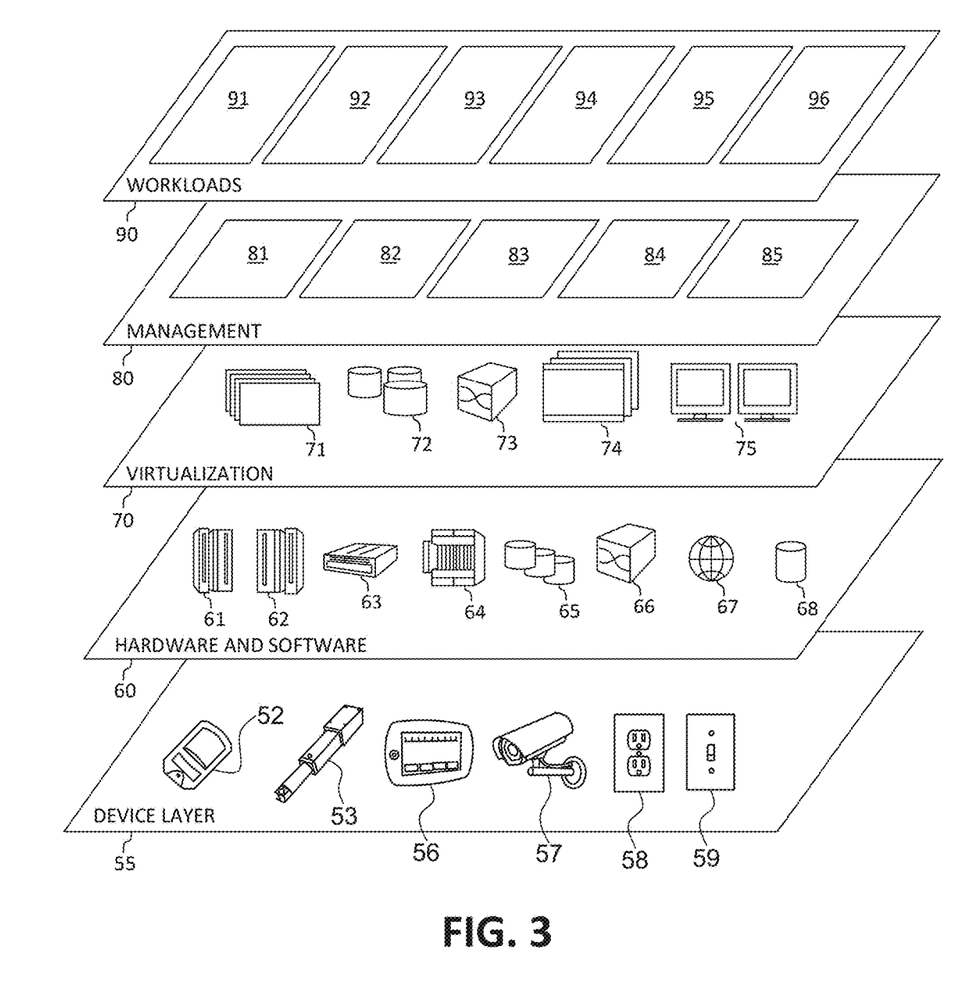
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various workloads and functions 96 for providing enhanced endpoint multicast emulation in a computer. In addition, configuring settings for various workloads and functions 96 for providing enhanced endpoint multicast emulation in a computer may include such operations as data analysis (including data collection and processing from various environmental sensors), networking, sending/receiving data, providing virtualization/virtual compute, encryptions, cloud computing communications, and/or management functions. One of ordinary skill in the art will appreciate that the configuring settings for various workloads and functions 96 for providing enhanced endpoint multicast emulation in a computer may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution for providing enhanced endpoint multicast emulation in a computing environment. One or more multicast operations may be executed on an overlay network using endpoint multicast emulation by using an overlay layer or a virtual extensible LAN ("VXLAN") layer to maintain control over one or more multicast groups.

Figure 4:
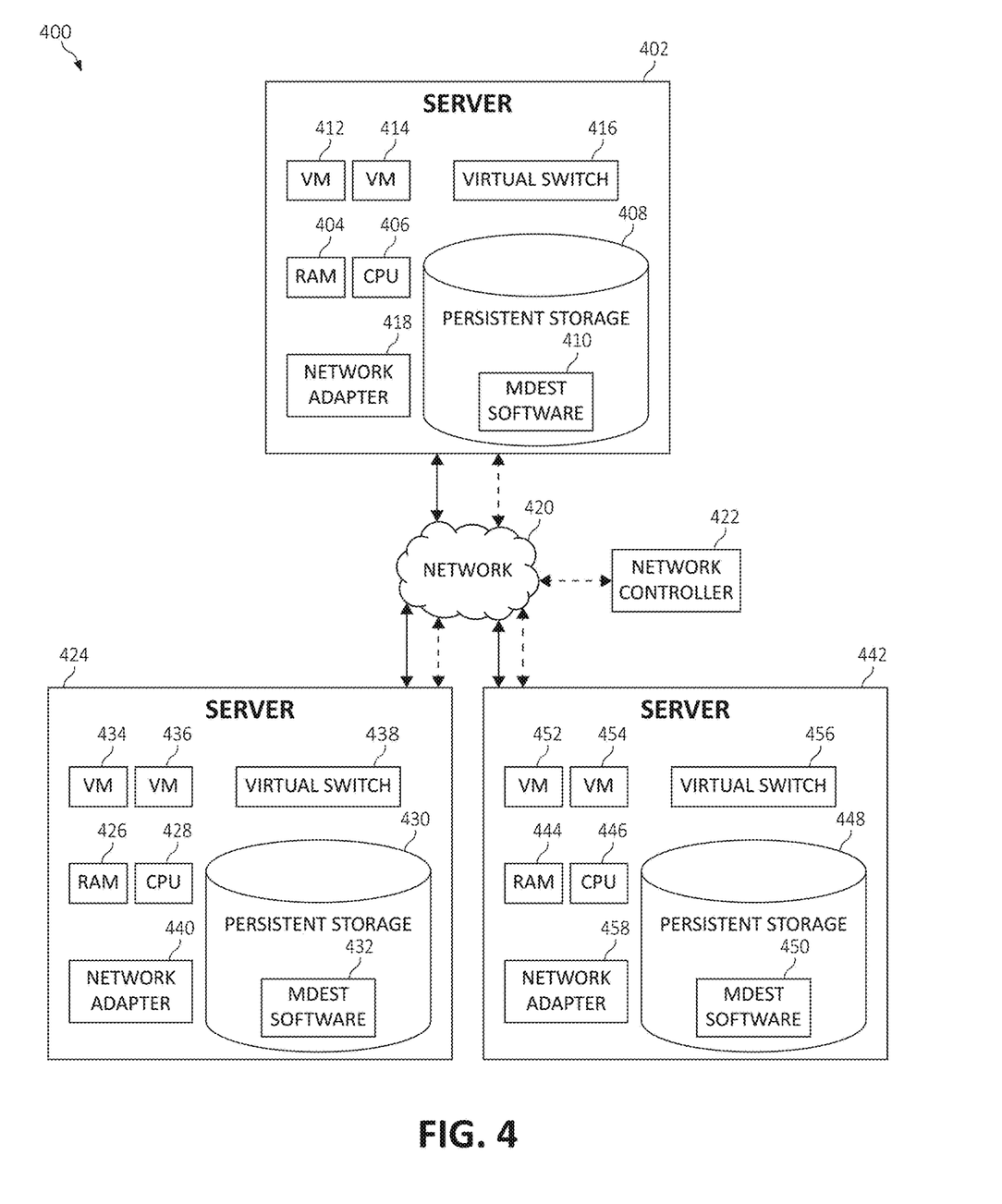
FIG. 4 is a functional block diagram illustrating a multi-destination packet processing environment according to an embodiment of the present invention.

For further explanation, FIG. 4 is a functional block diagram 400 illustrating a multi-destination packet processing environment, in an embodiment in accordance with the present invention. It should be noted that the descriptions and embodiments of FIGS. 1-3 can be used in FIG. 4. Repetitive description of like elements employed in other embodiments described herein (e.g., FIG. 4) is omitted for sake of brevity.

Multi-destination packet processing environment 400 includes a server 402, a network controller 422, a server 424, and a server 442, all interconnected over a network 420. Servers 402, 424, and 442 may each be any electronic device or combination of electronic devices capable of processing program instructions and receiving and sending data, for example, over network 420. In some embodiments, servers 402, 424, and 442 may be any of a laptop computer, a tablet computer, a netbook computer, a personal computer (PC), a desktop computer, a server computer, a personal digital assistant (PDA), or smart phone. In other embodiments, servers 402, 424, and 442 may each represent server computing systems utilizing multiple computers as a server system, such as in a distributed computing environment.

Server 402 includes a RAM 404, a CPU 406, a persistent storage 408, a VM 412, a VM 414, a virtual switch 416, and a network adapter 418. Persistent storage 408 may, for example, be a hard disk drive. Alternatively, or in addition to a magnetic hard disk drive, persistent storage 408 may include a solid-state hard drive, a semiconductor storage device, read-only memory (ROM), erasable programmable read-only memory (EPROM), flash memory, or any other computer-readable storage medium that is capable of storing program instructions or digital information. Persistent storage 408 stores operating system software, as well as software that enables server 402 to communicate with network controller 422, server 424, and server 442 over a data connection on network 420. Multi-destination software 410 (sometimes abbreviated as "mdest software 410") is also stored in persistent storage 408. Multi-destination software 410 is software that enables virtual switch 416 to communicate with network controller 422, VM 412 and VM 414 on server 402; a VM 434, a VM 436, and a virtual switch 438 on server 424; and a VM 452, a VM 454, and a virtual switch 456 on server 442 over network 420. Multi-destination software 410 also enables network controller 422 to provision virtual switches 416, 438, and 456 with multi-destination group receiver lists for a given multi-destination group.

VM 412 communicates with VM 434 and VM 452 through virtual switch 416, virtual switch 438, and virtual switch 456 using an overlay virtual network on network 420. VM 414 communicates with VM 436 and VM 454 through virtual switch 416, virtual switch 438, and virtual switch 456 using a separate overlay virtual network on network 420. Virtual switch 416 is used by VM 412 and VM 414 to communicate with nodes on their respective overlay network on network 420. In one embodiment, there may be many virtual machines and virtual overlay networks existing in multi-destination packet processing environment 400. In other embodiments, network controller 422 may reside on a server in multi-destination packet processing environment 400, or as a standalone computer connected to network 420.

Network adapter 418 is a computer hardware component that connects server 402 to network 420. Network adapter 418 allows server 402 to communicate with network controller 422, server 424, and server 442. Network adapter 418 also includes offload capabilities which allow network adapter 418 to maintain maps of multi-destination groups and TEPs, provides application program interfaces (APIs) to manipulate such maps, and handles head-end-replication for multi-destination packets based on offload instructions provided by a software-based data path. Network adapter 418 also enables VM 412 to communicate with VM 434 and VM 452 through virtual switch 416, virtual switch 438, and virtual switch 456 using an overlay virtual network on network 420. Network adapter 418 also enables VM 414 to communicate with VM 436 and VM 454 through virtual switch 416, virtual switch 438, and virtual switch 456 using a separate overlay virtual network on network 420.

In FIG. 4, network 420 is shown as the interconnecting fabric between server 402, network controller 422, server 424, and server 442. In practice, network 420 may be any viable data transport network. Network 420 can be, for example, a local area network (LAN), a wide area network (WAN) such as the Internet, or a combination of the two, and can include wired, wireless, or fiber optic connections. In general, network 420 can be any combination of connections and protocols that will support communications between server 402, network controller 422, server 424, and server 442 in accordance with an embodiment of the invention.

Network Controller 422 is an SDN controller that has visibility of end-to-end provisioning of virtual networks, virtual switches, virtual endpoints (multi-destination senders and receivers). Network Controller 422 is responsible for generating, and provisioning, the multi-destination group receivers list within a given multi-destination group, e.g., VM 412, VM 434 and VM 452, to the virtual switch, e.g., virtual switch 456, that has the multi-destination sender for the given multi-destination group. In one embodiment, network controller 422 may be a separate computer system, server, or hardware in multi-destination packet processing environment 400. In another embodiment, network controller 422 may be part of server 402, server 424, or server 442. Some embodiments may include more than one network controller in multi-destination packet processing environment 400 to, for example, serve as a backup to network controller 422.

Server 424 includes a RAM 426, a CPU 428, a persistent storage 430, VM 434, VM 436, virtual switch, and a network adapter 440. Persistent storage 430 contains mdest software 432 analogous to mdest software 410. Network adapter 440 is a computer hardware component that connects server 424 to network 420. Network adapter 440 allows server 424 to communicate with network controller 422, server 402, and server 442. Network adapter 440 also includes offload capabilities which allow network adapter 440 to maintain maps of multi-destination groups and TEPs, provides application program interfaces ("APIs") to manipulate such maps, and handles head-end-replication for multi-destination packets based on offload instructions provided by a software-based data path. Network adapter 440 also enables VM 434 to communicate with VM 412 and VM 452 through virtual switch 438, virtual switch 416, and virtual switch 456 using an overlay virtual network on network 420. Network adapter 440 also enables VM 436 to communicate with VM 414 and VM 454 through virtual switch 438, virtual switch 416, and virtual switch 456 using a separate overlay virtual network on network 420.

Server 442 includes a RAM 444, a CPU 446, a persistent storage 448, VM 452, VM 454, virtual switch 456, and a network adapter 458. Persistent storage 448 contains mdest software 450 analogous to mdest software 410. Network adapter 458 is a computer hardware component that connects server 442 to network 420. Network adapter 458 allows server 442 to communicate with network controller 422, server 402, and server 424. Network adapter 458 also includes offload capabilities which allow network adapter 458 to maintain maps of multi-destination groups and TEPs, provides application program interfaces (APIs) to manipulate such maps, and handles head-end-replication for multi-destination packets based on offload instructions provided by a software-based data path. Network adapter 458 also enables VM 452 to communicate with VM 412 and VM 434 through virtual switch 456, virtual switch 416, and virtual switch 438 using an overlay virtual network on network 420. Network adapter 458 also enables VM 454 to communicate with VM 414 and VM 436 through virtual switch 456, virtual switch 416, and virtual switch 438 using a separate overlay virtual network on network 420.

In example embodiment of FIG. 4, server 442 serves as the multi-destination sender for a multi-destination group referred to as "MDG-1" hosted on virtual switch 456 and handles network data for VM 412, VM 434, VM 452, virtual switch 438, and virtual switch 416. Server 442 also serves as the multi-destination sender for a multi-destination group referred to as "MDG-2" (not shown) hosted on virtual switch 456 and handles network data for VM 414, VM 436, VM 454, virtual switch 438, and virtual switch 416. In other embodiments, multi-destination groups may be hosted on one or more virtual switches in multi-destination packet processing environment 400.

Using the various components of FIG. 4, the present invention may provide multicasting in a virtual network. For example, a server such as, for example, server 402, server 424, and/or server 442, may provide enhanced endpoint multicast emulation in the multi-destination packet processing environment. One or more multicast operations may be executed on an overlay network using endpoint multicast emulation by using an overlay layer or a virtual extensible LAN ("VXLAN") layer to maintain control over one or more multicast groups.

For example, server 402 (or other servers such as, for example, server 424, and/or server 442) may track the one or more multicast groups using the overlay layer. The server 402 may track the one or more multicast groups using the VXLAN layer.

The server 402 may track intercept a request by an application to join the one or more multicast groups and retained by the overlay layer without being transferred to virtual network. The server 402 may intercept a request by an application to join the one or more multicast groups and retained by the VXLAN without being transferred to virtual network.

The server 402 may detect an application joined the one or more multicast groups; and update membership of the one or more multicast groups upon detecting the application joined the one or more multicast groups. The server 402 may send UDP datagrams to each member of the one or more multicast groups.

Figure 5:
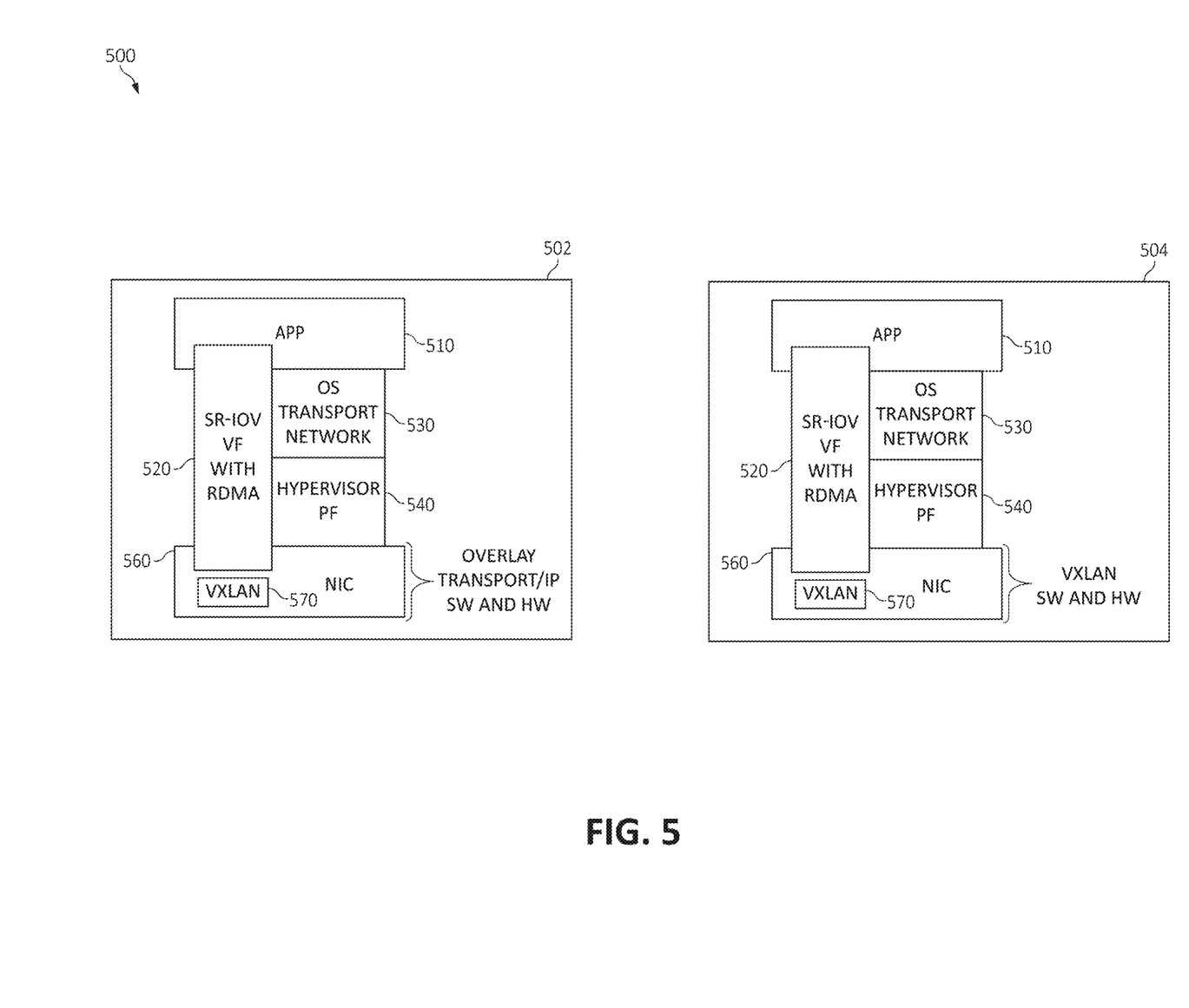
FIG. 5 is a functional block diagram illustrating providing enhanced endpoint multicast emulation in the computer environment according to an embodiment of the present invention.

Turning now to FIGS. 5, diagram 500 depicts computing system 502 and 504 deploying various exemplary embodiments for providing enhanced endpoint multicast emulation in the computer. It should be noted that the descriptions and embodiments of FIGS. 1-4 can be used in FIG. 5. Repetitive description of like elements employed in other embodiments described herein (e.g., FIG. 4) is omitted for sake of brevity. The computing system 502 is similar to computing system 504, except overlay logic is used to control multicast group membership instead of VXLAN logic, as described herein.

As depicted in FIG. 5, the computing systems 502 and 504 both include an application 510 ("app"), an operating system ("OS") transport network 530, a Root I/O Virtualization (SR-IOV) virtual functions ("VF") with remote direct memory access ("RDMA") component 520, a hypervisor physical functions ("PF") component 540, an VXLAN 570 and a NIC 560 (e.g., smart NIC).

The computing system 504 may be used for collective emulation using VXLAN logic layer such as, for example using the VXLAN 570 and NIC 560 (e.g., the overlay transport/IP software ("SW") and hardware ("HW")).

The Smart NIC/NIC 570 adapter's VXLAN layer is used to keep control of multicast groups, as describe in the following steps.

In step 1), when the application 510 ("app") joins a multicast group (e.g., sends a User Datagram Protocol (UDP) join request to join), the adapter VXLAN software (e.g., the VXLAN 570) consumes the request and prevents transferring the request to the network. Rather, the VXLAN software (e.g., the VXLAN 570) adds the overlay IP and virtual network interface ("VNI") of the application 510 ("app") to a multicast group in the SDN control plane (so other nodes become aware of it) and to the adapter 560 hardware pipeline (which is part of the Smart NIC/VXLAN 570 transmit and receive logic).

In step 2), after a UDP join request is completed, the application 510 can send messages to the multicast IP.

In step 3), when the application 510 sends a message to the multicast group, the adapter's VXLAN software (e.g., the VXLAN 570) or, for increased and maximum performance, hardware performs a $N_x$ UDP sends to the associated VNI, overlay IP, and underlay IP, where N represents each member of the group. This can be done by using an N counter to count down and send the same UDP multicast datagram to each of the members of the group and then return a completion when the datagram is sent to the last member.

In step 4), when a message is received for the IP of the application 510, it is delivered to the application 510 by the adapter's VXLAN logic (e.g., the VXLAN 570 hardware pipeline.

In step 5, when the application 510 leaves a group, the IP address of the application 510 is removed from the adapter's VXLAN multicast group and the SDN control plane.

Figure 6A:
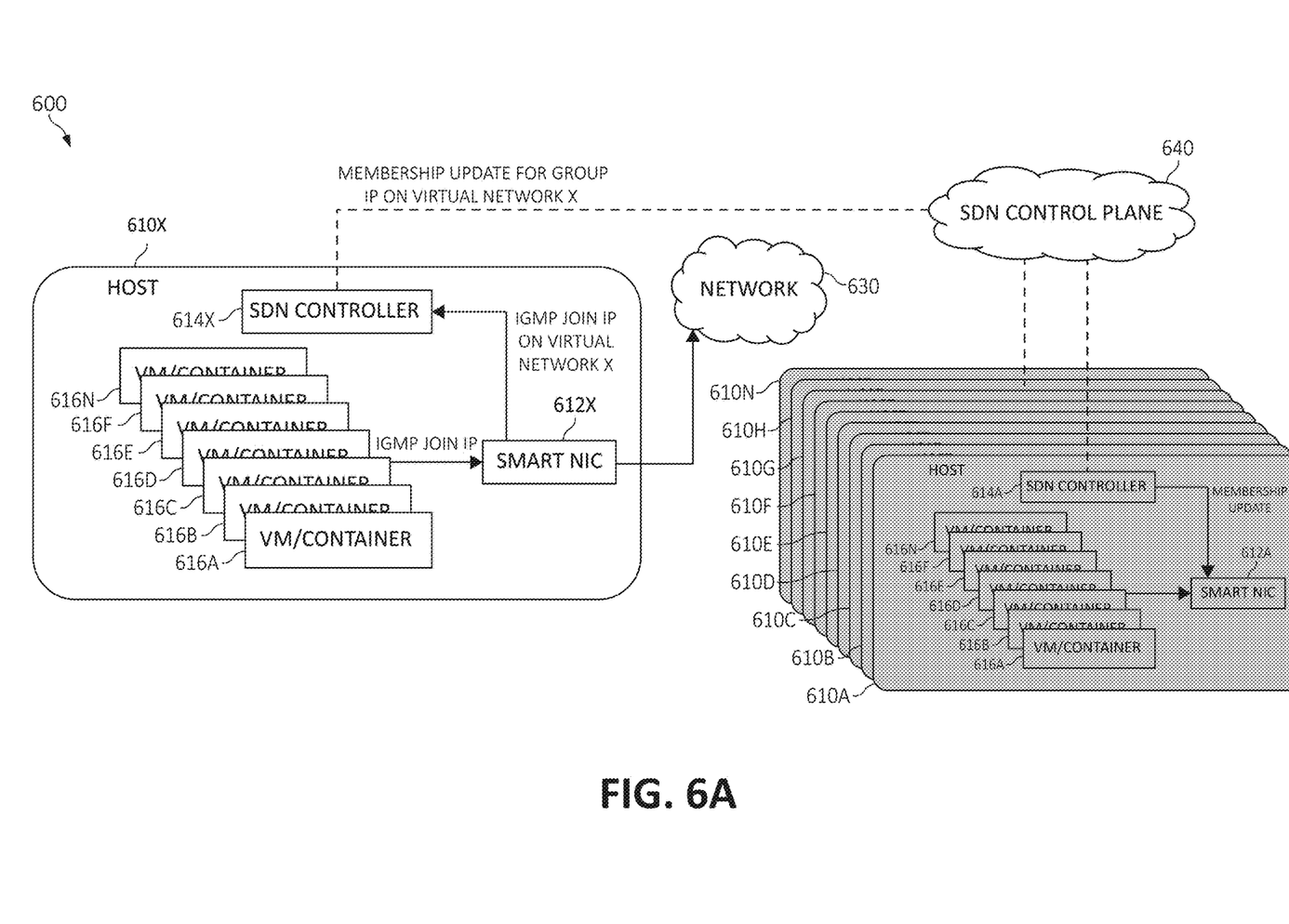
FIG. 6 illustrate various exemplary embodiments for providing enhanced endpoint multicast emulation in the computer environment in which various aspects of the present invention may be realized.
Figure 6B:
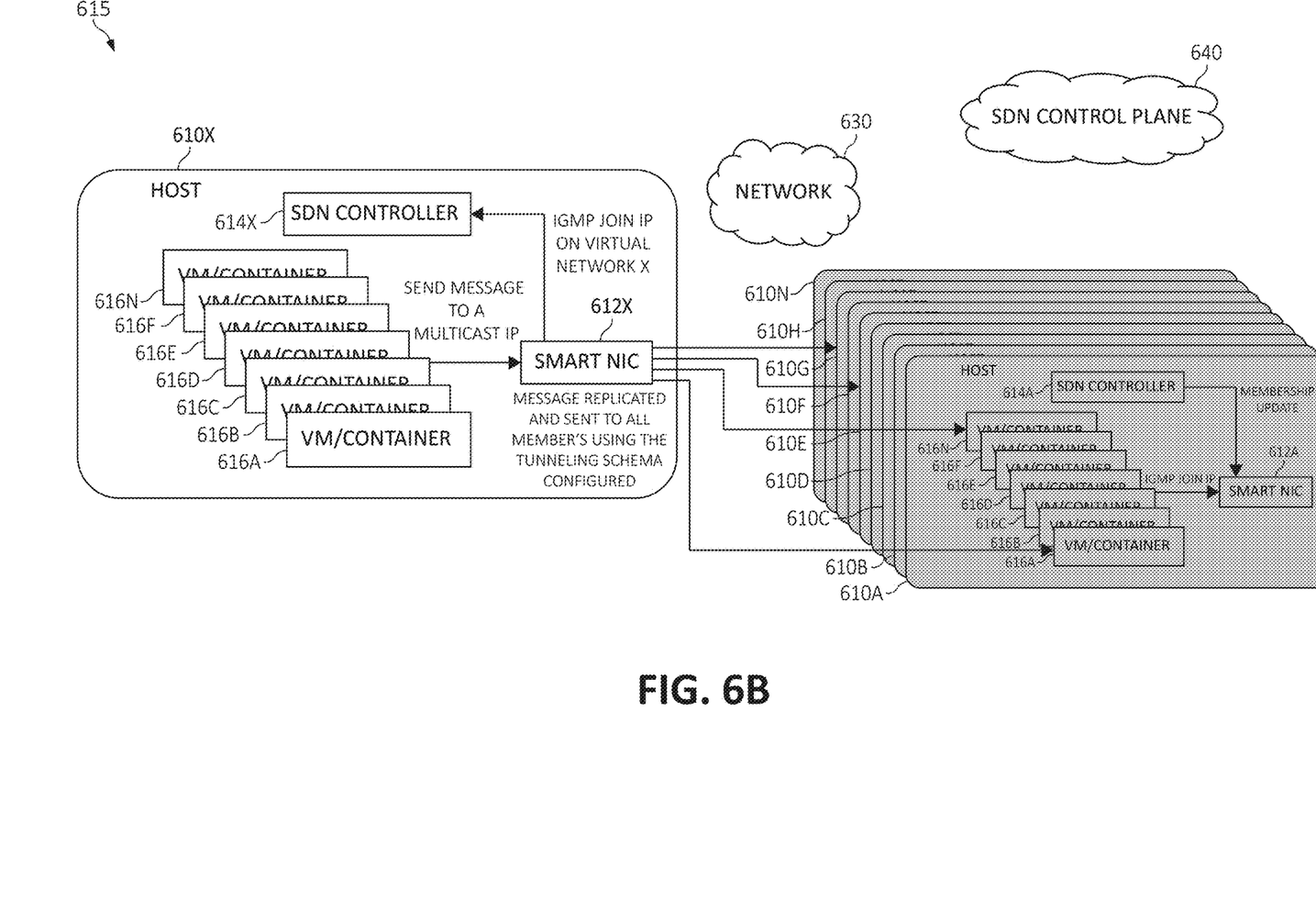

For further explanation, FIGS. 6A-6B illustrate various exemplary embodiments for providing enhanced endpoint multicast emulation in the computer environment in which various aspects of the present invention may be realized. It should be noted that the descriptions and embodiments of FIGS. 1-5 can be used in FIGS. 6A-6B. Repetitive description of like elements employed in other embodiments described herein (e.g., FIG. 4) is omitted for sake of brevity.

As depicted in FIGS. 6A-6B, one or more hosts such as, for example, hosts 610X and host 610A-N is depicted. The host 610 may include one or more VM/containers 616A-N, an SDN controller such as, for example, SDN controller 614X and 614A, and a smart NIC such as, for example, smart NIC 612X and 612A. The hosts 610X and host 610A may be connected to an SDN control plane 640. In some aspect, the host 610X may be in communication with network 630.

It should be noted that FIG. 6A-6B depicts, for example, the relationship where SDN controller software can be part of the Smart NIC or host software. For example, a Smart NIC (e.g., the smart NIC 612X and 612A) implements overlay transport/IP and VXLAN protocols and interacts with the SDN controller (e.g., SDN controller 614X and 614A). So, the Smart NIC (e.g., the smart NIC 612X and 612A) exposes APIs to the SDN controller (e.g., SDN controller 614X and 614A) which allow the the SDN controller (e.g., SDN controller 614X and 614A) to set the VXLAN state. Also, it implements the SDN controller (e.g., SDN controller 614X and 614A) APIs to inform the SDN control plane (e.g., SDN control plane 640) via the SDN controller (e.g., SDN controller 614X and 614A) about changes in multicast group membership.

More specifically, as depicted in FIGS. 6A, an operation for membership selective propagation via the SDN control plane 640 may be performed. A host such as, for example, host 610X may intercept one or more IGMP messages on a virtual network 630 and maintain an IGMP/Multicast group membership on an out of band SDN path and communicate that membership to each node (e.g., each virtual end point) in a computing system that have at least one virtual entity on that specific virtual group.

When a message is to be sent by one of the nodes (e.g., a virtual end point, which may be a host 610A-N or 610X) it will be intercepted by a Smart NIC such as, for example, Smart NIC 612X (in association with the SDN controller 614X) and sent to all the members (e.g., hosts 610A-610B) using the virtualization tunnel mechanism used in a virtualization solution like (e.g., VLAN, VxLan, Geneve etc. as indicated in FIG. 5) to implement a virtual IGMP/Multicast in a distributed manner.

That is, as depicted in FIG. 6B, the Smart NIC such as, for example, Smart NIC 612X may replicate a message (e.g., message replication) on the source host such as, for example, the host 610X. That is, each VM/container 616A-N may send a message to a multicast IP via the Smart NIC such as, for example, Smart NIC 612X. For example, the host 610X replicates a message of the VM container 616D and sends the replicated message via the Smart NIC 612X to one or more requesting members such as, for example, the host 610A (e.g., VM/container 616A and 616N), the host 610F, and host 610G, each of which may have previously issued a request (e.g., IGMP join request sent to SDN controller 614A on virtual network X) to join the one or more multicast groups and retained by the overlay layer without being transferred to virtual network and the Smart NIC 612A intercepted the request.

Thus, using one or more components of FIGS. 6A-6B, the host 610X may execute one or more multicast operations on an overlay network using endpoint multicast emulation by using an overlay layer or a virtual extensible LAN ("VXLAN") layer to maintain control over one or more multicast groups (e.g., one or more other hosts 610A-N, which may be considered as members of a group for receiving multicast data an overlay layer or a virtual extensible LAN ("VXLAN")). The host 610X may track the one or more multicast groups using the overlay layer. The host 610X may participate in one or more multicast groups using the VXLAN layer.

The host 610A may intercept, via the Smart NIC 612A, a request by an application (e.g., applications associated with one or more hosts 610N) to join the one or more multicast groups and retained by the overlay layer without being transferred to virtual network.

The host 610A may intercept, via the Smart NIC 612A, a request by an application (e.g., applications associated with one or Fiore hosts 610A-N) to join the one or more multicast groups and retained by the VXLAN without being transferred to virtual network.

The host 610X, in association with the Smart NIC and/or SDN controller 614X, may detect an application (e.g., applications associated with one or more hosts 610A-N) joined or left the one or more multicast groups, which may be determined/detected via the Smart NIC (e.g., Smart NIC 612X), forwarded to the SDN controller (e.g., SDN controller 614X) and in turn trigger a membership update for group internet protocol ("IP") on a virtual network ("VNET"), and finally stop forwarding User Datagram Protocol (UDP) datagrams belonging to that group to the leaving host etc.

The host 610X, in association with the Smart NIC and/or SDN controller 614, may update membership of the one or more multicast groups (e.g., one or more hosts 610A-N) upon detecting the application joined the one or more multicast groups. The host 610X, in association with the Smart NIC and/or SDN controller 614, may send UDP datagrams to each member of the one or more multicast groups (e.g., one or e hosts 610A-N).

Figure 7:
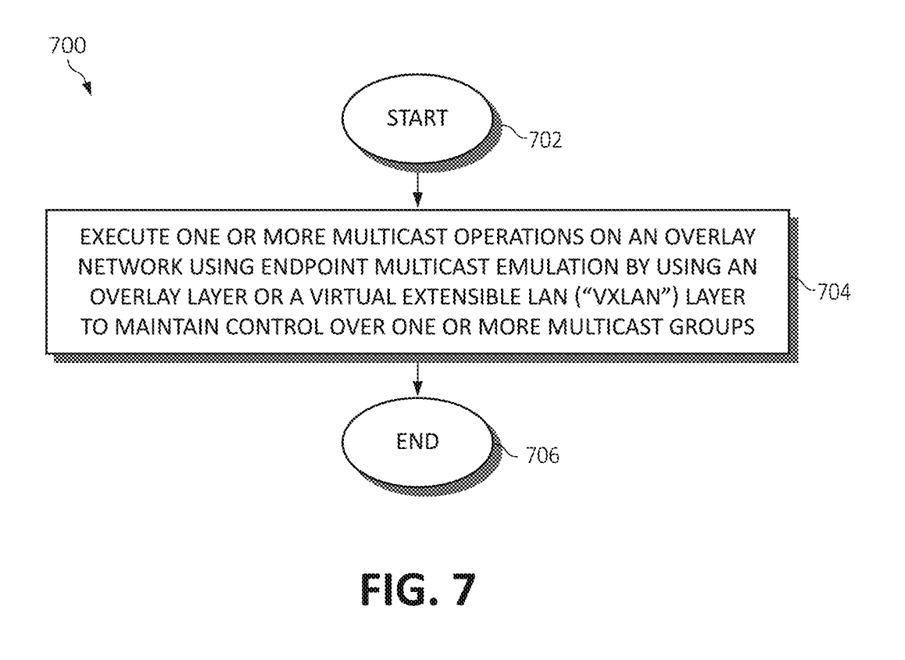
FIG. 7 is a flowchart diagram depicting an exemplary method for providing enhanced endpoint multicast emulation in the computer environment, again in which various aspects of the present invention may be realized.

Turning now to FIG. 7, a method 700 for providing enhanced endpoint multicast emulation in the computer environment is depicted. In one aspect, each of the devices, components, modules, operations, and/or functions described in FIGS. 1-6A-6B also may apply or perform one or more operations or actions of FIG. 6. The functionality 700 may be implemented as a method executed as instructions on a machine, where the instructions are included on at least one computer readable medium or one non-transitory machine-readable storage medium. The functionality 700 may start in block 702.

One or more multicast operations may be executed on an overlay network using endpoint multicast emulation by using an overlay layer or a virtual extensible LAN ("VXLAN") layer to maintain control over one or more multicast groups, as in block 704. The functionality 700 may end, as in block 706.

In one aspect, in conjunction with and/or as part of at least one block of FIG. 7, the operations of method 700 may include each of the following. The operations of method 700 may track the one or more multicast groups using the overlay layer. The operations of method 700 may track the one or more multicast groups using the VXLAN layer. The operations of method 700 may intercept a request by an application to join the one or more multicast groups and retained by the overlay layer without being transferred to virtual network, and/or intercept a request by an application to join the one or more multicast groups and retained by the VXLAN without being transferred to virtual network.

The operations of method 700 may detect an application joined the one or more multicast groups; and update membership of the one or more multicast groups upon detecting the application joined the one or more multicast groups. The operations of method 700 may send UDP datagrams to each member of the one or more multicast groups.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing enhanced endpoint multicast emulation in a computing environment, comprising:
executing one or more multicast operations on an overlay network using endpoint multicast emulation by using one of an overlay layer or a virtual extensible LAN (VXLAN) layer to maintain control over one or more multicast groups, wherein the one or more multicast operations comprise intercepting, by a smart network interface controller (NIC) on a host device, a User Datagram Protocol (UDP) request from an application one the host device, the UDP request being a request to join a first multicast group of the one or more multicast groups, wherein host membership in the one or more multicast groups is maintained in a software-defined networking (SDN) controller on the host device, and wherein the smart NIC prevents transfer of the UDP request to a transport network and, upon detecting that the application has joined the first multicast group, the smart NIC transmits the UDP request to a SDN control plane via an Application Program Interface (API) exposed to the SDN controller to inform SDN controllers on each of other host devices in the computing environment that have at least one virtual entity in the first multicast group that the application has joined the first multicast group, the UDP request transmitted through an out-of-band SDN path that bypasses the overlay network, and wherein overlay IP address and virtual network interface of the application are added by VXLAN software on the smart NIC to membership information of the first multicast group maintained by the SDN controller on the host device and by the SDN controllers on each of the other host devices, and wherein messages sent by the application in the first multicast group are intercepted by the smart NIC, the smart NIC replicating the messages and sending one of the replicated messages to each of the other host devices using a virtualization tunnel, and wherein each of the other host devices has issued a request to join the first multicast group and wherein the requests to join are retained by one of the overlay layer or the virtual extensible LAN (VXLAN) layer without being transferred to virtual network.

2. The method of claim 1, further including tracking the one or more multicast groups using the overlay layer.

3. The method of claim 1, further including tracking the one or more multicast groups using the VXLAN layer.

4. The method of claim 1, further including intercepting the request by the application to join the one or more multicast groups, wherein the request is retained by the overlay layer without being transferred to the overlay network.

5. The method of claim 1, further including intercepting the request by the application to join the one or more multicast groups, wherein the request is retained by the VXLAN layer without being transferred to the overlay network.

6. The method of claim 1, further including:
detecting the application joined the one or more multicast groups; and
updating membership of the one or more multicast groups upon detecting the application joined the one or more multicast groups.

7. The method of claim 1, further including sending User Datagram Protocol (UDP) datagrams to each member of the one or more multicast groups.

8. A system for providing enhanced endpoint multicast emulation in a computing environment, comprising:
one or more computers with executable instructions that when executed cause the system to:
execute one or more multicast operations on an overlay network using endpoint multicast emulation by using one of an overlay layer or a virtual extensible LAN (VXLAN) layer to maintain control over one or more multicast groups, wherein the one or more multicast operations comprise intercepting, by a smart network interface controller (NIC) on a host device, a User Datagram Protocol (UDP) request from an application on the host device, the UDP request being a request to join a first multicast group of the one or more multicast groups, wherein host membership in the one or more multicast groups is maintained in a software-defined networking (SDN) controller on the host device, and wherein the smart NIC prevents transfer of the UDP request to a transport network and, upon detecting that the application has joined the first multicast group, the smart NIC transmits the UDP request to a SDN control plan via an Application Program Interface (API) exposed to the SDN controller to inform SDN controllers on each of other host devices in the computing environment that have at least one virtual entity in the first multicast group that the application has joined the first multicast group, the UDP request transmitted through an out-of-band SDN path that bypasses the overlay network, and wherein overlay IP address and virtual network interface of the application are added by VXLAN software on the smart NIC to membership information of the first multicast group maintained by the SDN controller on the host device and by the SDN controllers on each of the other host devices, and wherein messages sent by the application in the first multicast group are intercepted by the smart NIC, the smart NIC replicating the messages and sending one of the replicated messages to each of the other host devices using a virtualization tunnel, and wherein each of the other host devices has issued a request to join the first multicast group and wherein the requests to join are retained by one of the overlay layer or the virtual extensible LAN (VXLAN) layer without being transferred to virtual network.

9. The system of claim 8, wherein the executable instructions when executed cause the system to track the one or more multicast groups using the overlay layer.

10. The system of claim 8, wherein the executable instructions when executed cause the system to track the one or more multicast groups using the VXLAN layer.

11. The system of claim 8, wherein the executable instructions when executed cause the system to intercept the request by the application to join the one or more multicast groups, wherein the request is retained by the overlay layer without being transferred to the overlay network.

12. The system of claim 8, wherein the executable instructions when executed cause the system to intercept the request by the application to join the one or more multicast groups, wherein the request is retained by the VXLAN layer without being transferred to the overlay network.

13. The system of claim 8, wherein the executable instructions when executed cause the system to:
  detect the application joined the one or more multicast groups; and
  update membership of the one or more multicast groups upon detecting the application joined the one or more multicast groups.

14. The system of claim 8, wherein the executable instructions when executed cause the system to send User Datagram Protocol (UDP) datagrams to each member of the one or more multicast groups.

15. A computer program product for providing enhanced endpoint multicast emulation in a computing environment, the computer program product comprising:
  one or more computer readable storage media, and program instructions collectively stored on the one or more computer readable storage media, the program instruction comprising:
  program instructions to execute one or more multicast operations on an overlay network using endpoint multicast emulation by using one of an overlay layer or a virtual extensible LAN (VXLAN) layer to maintain control over one or more multicast groups, wherein the one or more multicast operations comprise intercepting, by a smart network interface controller (NIC) on a host device, a User Datagram Protocol UDP request from an application on the host device, the UDP request being a request to join a first multicast group of the one or more multicast groups, wherein host membership in the one or more multicast groups is maintained in a software-defined networking (SDN) controller on the host device, and wherein the smart NIC prevents transfer of the UDP request to a transport network and, upon detecting that the application has joined the first multicast group, the smart NIC transmits the UDP request to a SDN control plane via an Application Program Interface (API) exposed to the SDN controller to inform SDN controllers on each of other host devices in a computing environment that have at least one virtual entity in the first multicast group that the application has joined the first multicast group, the UDP request transmitted through an out-of-band SDN path that bypasses the overlay network, and wherein overlay IP address and virtual network interface of the application are added by VXLAN software on the smart NIC to membership information of the first multicast group maintained by the SDN controller on the host device and by the SDN controllers on each of the other host devices, and wherein messages sent by the application in the first multicast group are intercepted by the smart NIC, the smart NIC replicating the messages and sending one of the replicated messages to each of the other host devices using a virtualization tunnel, and wherein each of the other host devices has issued a request to join the first multicast group and wherein the requests to join are retained by one of the overlay layer or the virtual extensible LAN (VXLAN) layer without being transferred to virtual network.

16. The computer program product of claim 15, further including program instructions to:
  track the one or more multicast groups using the overlay layer; and
  track the one or more multicast groups using the VXLAN layer.

17. The computer program product of claim 15, further including program instructions to intercept the request by the application to join the one or more multicast groups, wherein the request is retained by the overlay layer without being transferred to the overlay network.

18. The computer program product of claim 15, further including program instructions to intercept the request by the application to join the one or more multicast groups, wherein the request is retained by the VXLAN layer without being transferred to the overlay network.

19. The computer program product of claim 15, further including program instructions to:
  detect the application joined the one or more multicast groups; and
  update membership of the one or more multicast groups upon detecting the application joined the one or more multicast groups.

20. The computer program product of claim 15, further including program instructions to send User Datagram Protocol (UDP) datagrams to each member of the one or more multicast groups.

* * * * *